United States Patent
Murooka et al.

(10) Patent No.: US 8,186,962 B2
(45) Date of Patent: May 29, 2012

(54) FAN ROTATING BLADE FOR TURBOFAN ENGINE

(75) Inventors: Takeshi Murooka, Tokyo (JP); Ikuhisa Mizuta, Tokyo (JP)

(73) Assignee: IHI Corporation, Tokyo (JP)

( * ) Notice: Subject to any disclaimer, the term of this patent is extended or adjusted under 35 U.S.C. 154(b) by 729 days.

(21) Appl. No.: 12/300,277

(22) PCT Filed: Mar. 26, 2007

(86) PCT No.: PCT/JP2007/056169
§ 371 (c)(1),
(2), (4) Date: Nov. 10, 2008

(87) PCT Pub. No.: WO2007/138779
PCT Pub. Date: Dec. 6, 2007

(65) Prior Publication Data
US 2010/0232970 A1  Sep. 16, 2010

(30) Foreign Application Priority Data

May 26, 2006  (JP) ................................. 2006-146319

(51) Int. Cl.
B63H 1/26 (2006.01)
B63H 7/02 (2006.01)
(52) U.S. Cl. .................................................. 416/223 A
(58) Field of Classification Search .............. 416/223 A, 416/DIG. 2
See application file for complete search history.

(56) References Cited

U.S. PATENT DOCUMENTS

| 5,167,489 A | 12/1992 | Wadia et al. |
| 5,725,354 A | 3/1998 | Wadia et al. |
| 5,913,661 A * | 6/1999 | Panovsky et al. ......... 416/229 A |
| 5,947,688 A * | 9/1999 | Schilling et al. ............. 416/233 |
| 6,071,077 A | 6/2000 | Rowlands |
| 6,328,533 B1 * | 12/2001 | Decker et al. ................ 416/228 |
| 6,358,003 B2 | 3/2002 | Schlechtriem |
| RE38,040 E | 3/2003 | Spear et al. |
| 7,108,486 B2 * | 9/2006 | Talbotec et al. .............. 416/243 |
| 7,207,772 B2 * | 4/2007 | Johann ......................... 415/181 |
| 2005/0047919 A1 * | 3/2005 | Nussbaum et al. .......... 416/235 |
| 2005/0163617 A1 * | 7/2005 | Weisse .......................... 416/232 |

FOREIGN PATENT DOCUMENTS

| JP | 2001-214893 | 8/2001 |
| JP | 2005-315138 | 11/2005 |

OTHER PUBLICATIONS

International Search Report issued in corresponding application No. PCT/JP2007/056169, completed Apr. 11, 2007 and mailed Apr. 24, 2007.
Office Action issued in corresponding Canadian Patent Application No. 2,650,511, dated Aug. 20, 2010.
Office Action issued in related Canadian application 2,650,511, dated May 3, 2011.

* cited by examiner

*Primary Examiner* — Michelle Estrada
(74) *Attorney, Agent, or Firm* — Griffin & Szipl, P.C.

(57) ABSTRACT

A leading edge part of a fan rotating blade for taking air thereinto is provided with a vertical hub portion positioned on the hub side so as to be substantially perpendicular to a fan rotary shaft, a backward mid-span portion inclined toward the downstream side from the hub side to the mid-span portion, and a forward inclined tip portion inclined toward the upstream side from the mid-span side to the tip portion.

3 Claims, 6 Drawing Sheets

FAN ROTATING BLADE FOR TURBOFAN ENGINE

This is a National Phase Application in the United States of International Patent Application No. PCT/JP2007/056169 filed Mar. 26, 2007, which claims priority on Japanese Patent Application No. 146319/2006, filed May 26, 2006. The entire disclosures of the above patent applications are hereby incorporated by reference.

BACKGROUND OF THE INVENTION

1. Technical Field of the Invention

The present invention relates to a fan rotating blade for a turbofan engine.

2. Description of the Related Art

FIG. 1 is a schematic configuration diagram showing an aircraft engine 51 (a turbojet engine). As shown in this drawing, the turbojet engine is provided with a fan 52 for taking air thereinto, a compressor 53 for compressing the intake air, a combustor 54 for burning a fuel by the compressed air, a turbine 55 for driving the fan 52 and the compressor 53 by a combustion gas of the combustor 54, an after burner 56 for afterburning to increase a thrust, and the like.

In the invention, a pressure ratio indicates a total downstream pressure/a total upstream pressure of a blade. Additionally, a bypass ratio indicates a value obtained by dividing a flow rate on a bypass side (air directly passing through a nozzle to be discharged to the outside of the engine) by a flow rate on a core side (a flow toward the combustor via the compressor) at the downstream of the fan rotating blade.

The turbojet engine in which the fan 52 taking the air thereinto is enlarged in size and a bypass ratio is enlarged is called as "turbofan engine". The bypass ratio corresponds to a flow rate ratio (bypass flow/core flow) between an air flow (a core flow) flowing into a core engine (the compressor 53, the combustor 54, and the turbine 55 described above) and a bypass flow bypassing them. There is obtained an effect of reducing a flow speed of an exhaust jet and lowering noise and fuel consumption, in accordance with an increase of the ratio.

However, in the above-described turbofan engine, a problem arises in that a fan first-stage rotating blade (an up-front fan) and an inner diameter of a casing surrounding the fan first-stage rotating blade are enlarged by enlarging the bypass ratio, and a weight of the engine is increased.

In order to solve the problem, there are already disclosed fan rotating blades having various shapes capable of increasing the flow rate of air introduced from the outside without increasing the inner diameter of the casing (Patent Documents 1 to 6: FIGS. 2A to 2F).

[Patent Document 1]
U.S. Pat. No. 6,328,533B1 "SWEPT BARREL AIRFOIL"
[Patent Document 2]
U.S. Pat. No. 6,071,077 "SWEPT FAN BLADE"
[Patent Document 3]
U.S. Pat. No. RE38040E "SWEPT TURBOMACHINERY BLADE"
[Patent Document 4]
U.S. Pat. No. 5,167,489 "FORWARD SWEPT ROTOR BLADE"
[Patent Document 5]
U.S. Pat. No. 5,725,354 "FORWARD SWEPT FAN BLADE"
[Patent Document 6]
U.S. Pat. No. 6,358,003 B2 "ROTOR BLADE AN AXIAL-FLOW ENGINE"

As described above, in the turbofan engine according to the conventional art, a problem arises in that the fan first-stage rotating blade (the up-front fan) and the inner diameter of the casing surrounding the fan first-stage rotating blade are enlarged by enlarging the bypass ratio, and the weight of the engine is increased.

Additionally, in the fan first-stage rotating blade according to the conventional art, for example, when a rotary speed is increased in order to increase an amount of air introduced from the outside, a circumferential speed increases too much, thereby causing a problem in that a loss of a shock wave excessively increases at a high flow rate.

SUMMARY OF THE INVENTION

The present invention is contrived to solve the above-described problems. That is, an object of the invention is to provide a fan rotating blade for a turbofan engine capable of increasing a bypass ratio by increasing an intake air flow rate without enlarging a diameter of a fan and an inner diameter of a casing and of realizing a decrease in weight of an engine as well as a decrease in fuel consumption and noise.

Means for Solving the Problems

According to the invention, there is provided a fan rotating blade for a turbofan engine including: a leading edge part provided with a vertical hub portion positioned on the hub side so as to be substantially perpendicular to a fan rotary shaft, a backward mid-span portion inclined toward the downstream side from the hub side to the mid-span portion, and a forward inclined tip portion inclined toward the upstream side from the mid-span side to the tip portion.

According to a preferred embodiment of the invention, the vertical hub portion extends from an inner end position of 0% to an outer end position in a rage of 20% to 50% with respect to a total radial span of the leading edge part and is positioned within a range of ±5° with respect to a plane perpendicular to the fan rotary shaft.

Also, the backward inclined mid-span portion extends from an inner end position in a range of 20% to 50% to an outer end position in a range of 60% to 90% with respect to a total radial span of the leading edge part and its outside is inclined backward in a range of 5° to 45° with respect to a plane perpendicular to the fan rotary shaft.

Also, the forward inclined tip portion extends from an inner end position in a range of 60% to 90% to an outer end position of 100% with respect to a total radial span of the leading edge part and its outside is inclined forward in a range of 5° to 45° with respect to a plane perpendicular to the fan rotary shaft.

With the above-described configuration according to the invention, since the vertical hub portion on the hub side of the leading edge part is substantially perpendicular to the fan rotary shaft, a weight of the blade is smaller than a case in which the hub portion is inclined toward the upstream side, thereby particularly reducing a stress at the root of the leading edge part. Also, since a chord length is longer than a case in which the hub portion is inclined toward the downstream side, it is possible to increase a pressure ratio. Additionally, at the same time, when the chord length is long, a large flow is received on the hub side, thereby increasing a flow rate in the same engine front-surface area.

Also, since the outside of the backward inclined mid-span portion positioned at the mid-span is inclined backward with respect to the plane perpendicular to the fan rotary shaft, a blade center of gravity is more positioned on the downstream side than a case in which the outside is inclined forward (forward inclination), thereby particularly reducing a stress at the leading edge part on the hub side.

Also, since the outside of the forward inclined tip portion on the tip side is inclined forward, an inflow speed on the tip side is smaller than a case in which the outside is inclined backward (backward inclination), thereby reducing a loss of a shock wave.

Therefore, in a turbofan engine having a large bypass ratio, it is possible to increase an air flow rate of a fan first-stage rotating blade without enlarging the fan first-stage rotating blade and a diameter of a casing surrounding the fan first-stage rotating blade. Accordingly, since a bypass ratio is increased, it is possible to realize a decrease in fuel consumption and noise and to reduce a weight. Additionally, it is possible to more increase a pressure ratio on the hub side than the fan rotating blade according to the conventional art.

DESCRIPTION OF THE PREFERRED EMBODIMENT

Figure 1:
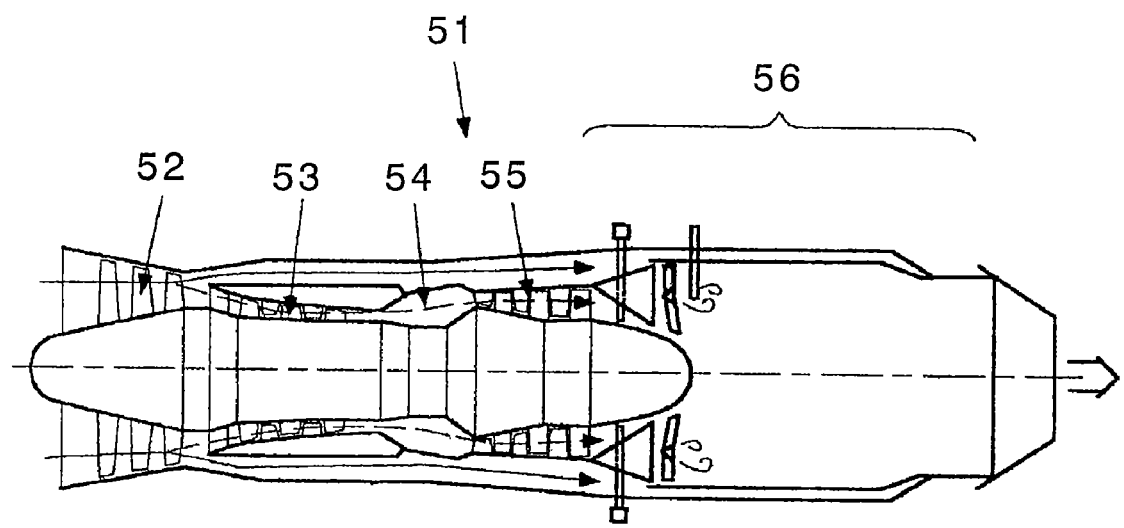
FIG. 1 is a configuration diagram showing a turbofan engine according to a conventional art.
Figure 2A:
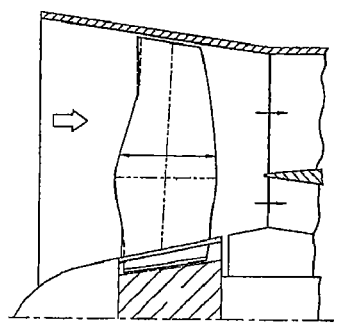
FIG. 2A is a schematic diagram showing a fan rotating blade shown in Patent Document 1.
Figure 2B:
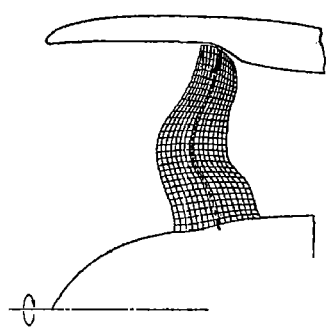
FIG. 2B is a schematic diagram showing a fan rotating blade shown in Patent Document 2.
Figure 2C:
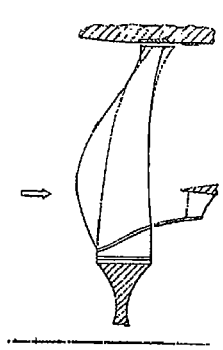
FIG. 2C is a schematic diagram showing a fan rotating blade shown in Patent Document 3.
Figure 2D:
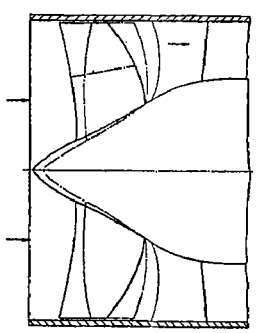
FIG. 2D is a schematic diagram showing a fan rotating blade shown in Patent Document 4.
Figure 2E:
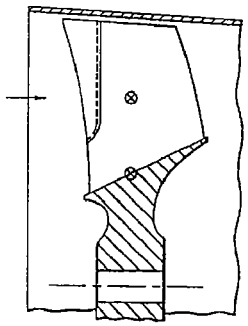
FIG. 2E is a schematic diagram showing a fan rotating blade shown in Patent Document 5.
Figure 2F:
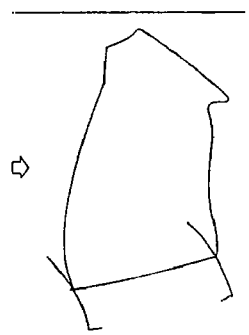
FIG. 2F is a schematic diagram showing a fan rotating blade shown in Patent Document 6.

Hereinafter, a preferred embodiment of the invention will be described with reference to the drawings. Also, in the respective drawings, the same reference numerals are given to the same components and the repetitive description thereof will be omitted.

Figure 3:
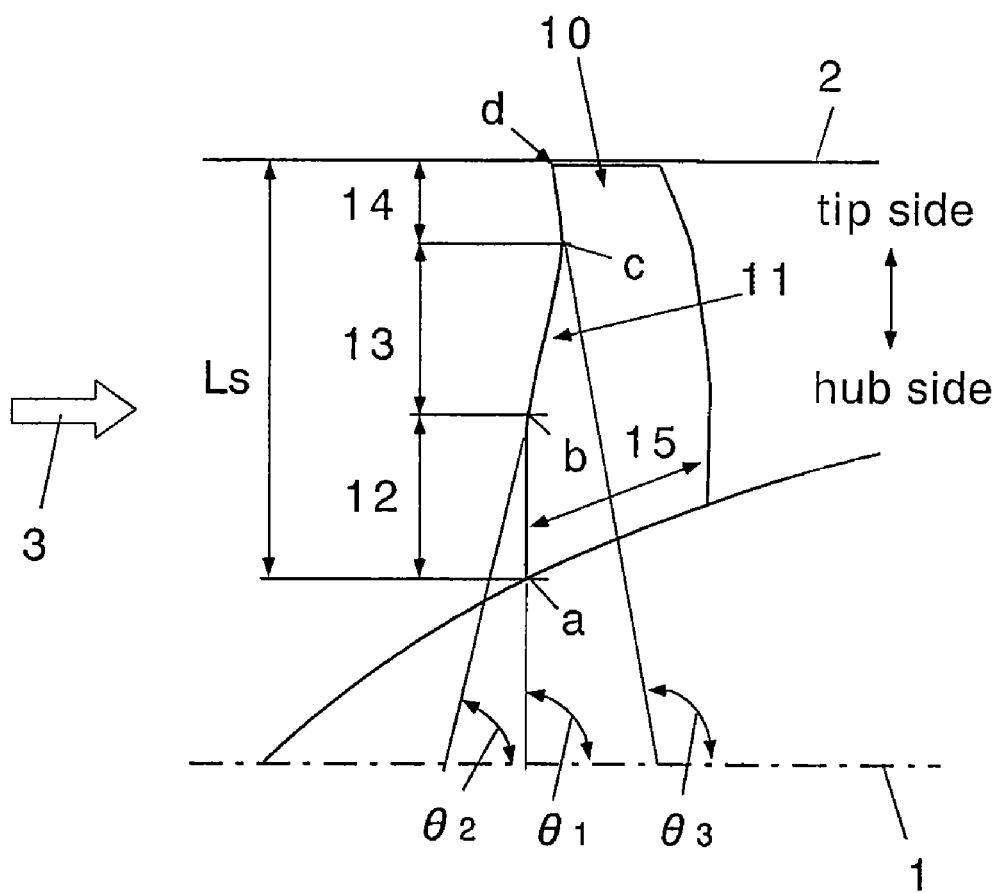
FIG. 3 is a configuration diagram showing a fan rotating blade for a turbofan engine according to the invention.

FIG. 3 is a configuration diagram showing a fan rotating blade for a turbofan engine according to the invention. In this drawing, Reference numeral 1 denotes an engine rotary shaft (fan rotary shaft), Reference numeral 2 denotes a casing inner diameter, and Reference numeral 3 denotes an intake air flow.

It is desirable that a fan rotating blade 10 according to the invention is a fan first-stage rotating blade, and a leading edge part 11 is formed by a vertical hub portion 12, a backward inclined mid-span portion 13, and a forward inclined tip portion 14.

The vertical hub portion 12 is positioned on the hub side so as to be substantially perpendicular to the fan rotary shaft 1.

In this example, it is desirable that the vertical hub portion 12 extends from an inner end position a of 0% to an outer end position b in a range of 40% to 50% with respect to a total radial span Ls of the leading edge part 11. Additionally, the vertical hub portion 12 is positioned within an angular rage of ±5° with respect to a plane perpendicular to the fan rotary shaft 1. That is, in this drawing, an angle θ1 is in a range of 85° to 95°.

The backward mid-span portion 13 is positioned at the mid-span in the middle of the hub side and the tip side so as to be inclined to the downstream side from the hub side to the mid-span portion.

In this example, it is desirable that the backward inclined mid-span portion 13 extends from an inner end position b in a range of 40% to 50% to an outer end position c in a range of 75% to 85% with respect to the total radial span Ls of the leading edge part 11. Additionally, in the backward inclined mid-span portion 13, an outside is inclined backward in a range of 5° to 45° with respect to a plane perpendicular to the fan rotary shaft 1. That is, in this drawing, an angle θ2 is in a range of 45° to 85°.

The forward inclined tip portion 14 is positioned on a tip side so as to be inclined toward the downstream side from the mid-span side to the tip portion.

In this example, it is desirable that the forward inclined tip portion 14 extends from an inner end position c in a range of 75% to 85% to an outer end position d of 100% with respect to the total radial span Ls of the leading edge part 11. Additionally, an outside of the forward inclined tip portion 14 is inclined forward in a range of 15° to 30° with respect to a plane perpendicular to the fan rotary shaft 1. That is, in this drawing, an angle θ3 is in a range of 95° to 135°.

Figure 4A:
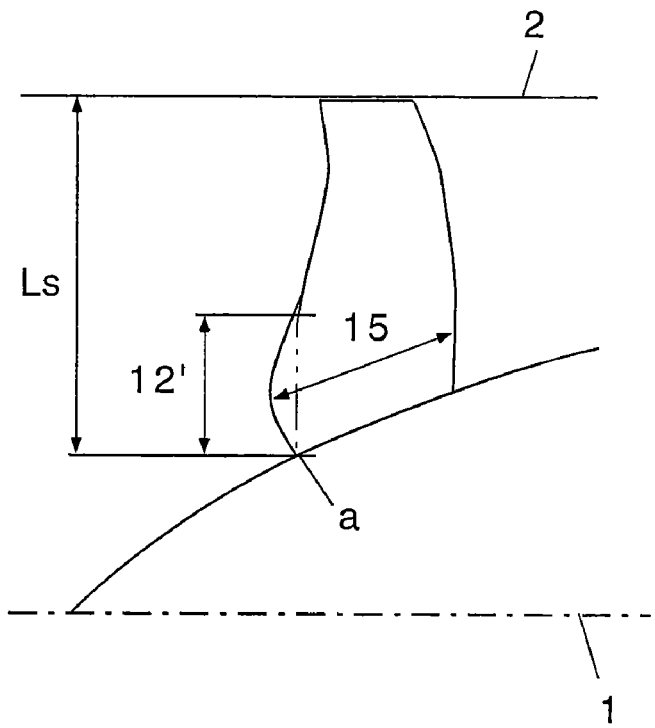
FIG. 4A is an explanatory diagram showing a vertical hub shown in FIG. 3.
Figure 4B:
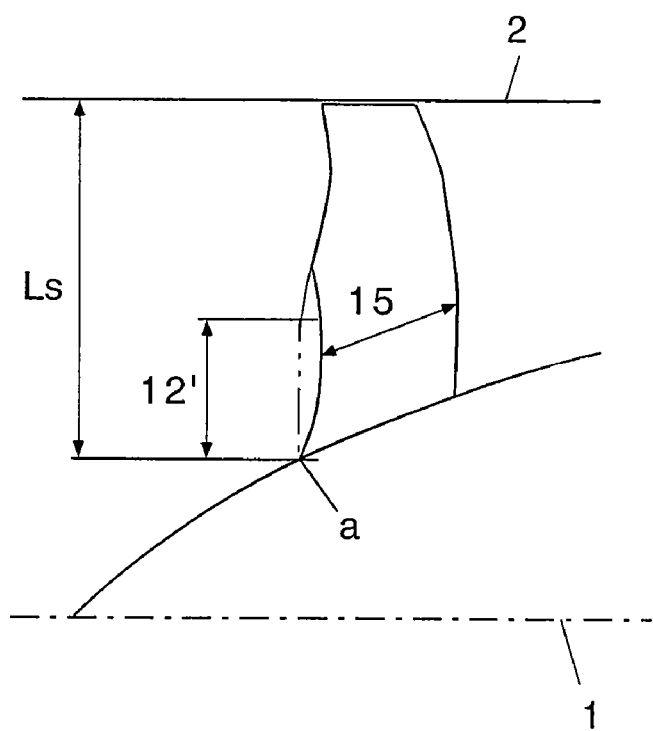
FIG. 4B is another explanatory diagram showing a vertical hub shown in FIG. 3.

FIGS. 4A and 4B are explanatory diagrams showing the vertical hub portion shown in FIG. 3. In this drawing, FIGS. 4A and 4B show a hub portion 12' different from the vertical hub portion according to the invention.

FIG. 4A shows a case in which the hub portion 12' is inclined to the upstream side with respect to the fan rotary shaft 1, where a chord length 15 is long and heavy and a stress is large at a root (position a) of the leading edge part 11.

Additionally, FIG. 4B shows a case in which the hub portion 12' is inclined to the downstream side with respect to the fan rotary shaft 1, where the chord length 15 is short, a pressure ratio is small, and a flow rate is small.

On the contrary, in this invention, since the vertical hub portion 12 on the hub side is substantially perpendicular to the fan rotary shaft 1, a weight of the blade is smaller than a case in which the hub portion is inclined toward the upstream side (FIG. 4A), thereby particularly reducing the stress at the root (position a) of the leading edge part 11.

Additionally, since the chord length 15 is longer than a case in which the hub portion is inclined toward the downstream side (FIG. 4B), it is possible to increase the pressure ratio.

Then, at the same time, when the chord length 15 is long, a large flow is received on the hub side, thereby increasing the flow rate in the same engine front-surface area.

Figure 5:
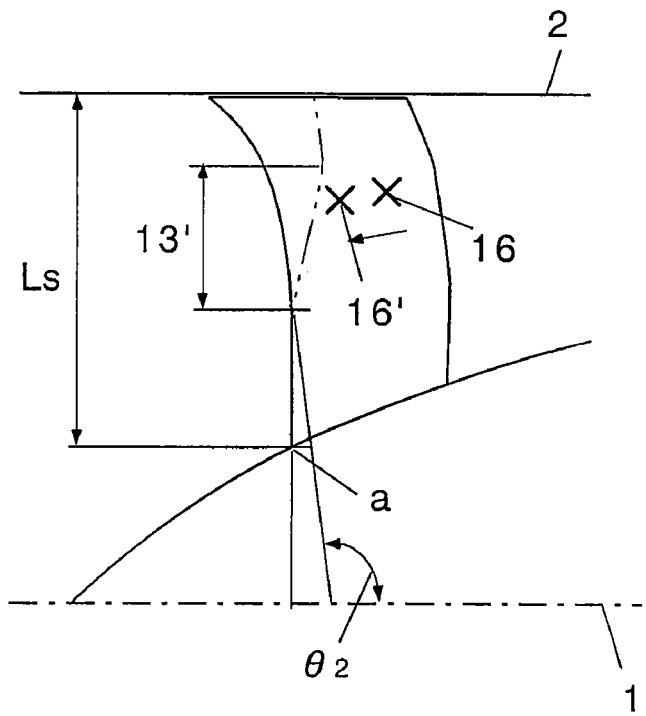
FIG. 5 is an explanatory diagram showing a backward inclined mid-span portion shown in FIG. 3.

FIG. 5 is an explanatory diagram showing the backward inclined mid-span portion shown in FIG. 3. This drawing shows a case in which the backward inclined mid-span portion is different from that of the invention and a mid-span portion 13' is inclined to the upstream side with respect to a hub-side path surface. That is, in this drawing, an angle θ2 is in a range of 95° to 135°.

In this case, since a blade center 16' of gravity moves to the upstream side, the stress at the root (position a) of the leading edge part 11 is large.

On the contrary, in this invention, since the outside of the backward inclined mid-span portion 13 positioned at the mid-span is inclined backward with respect to the plane perpendicular to the fan rotary shaft 1, a blade center 16 of gravity is more positioned on the downstream side than a case in which the outside is inclined forward (forward inclination) (FIG. 5), thereby particularly reducing the stress at the leading edge part (position a) on the hub side.

Figure 6:
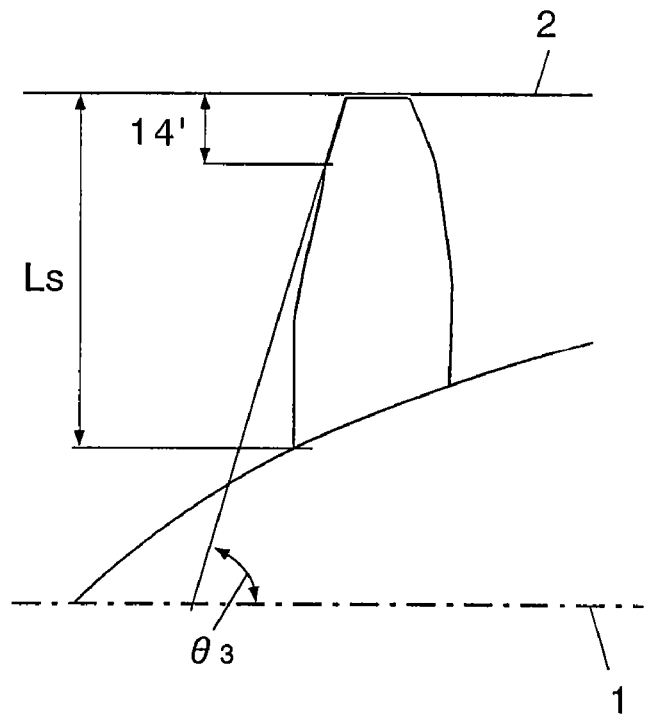
FIG. 6 is an explanatory diagram showing a forward inclined tip portion shown in FIG. 3.

FIG. 6 is an explanatory diagram showing a forward inclined tip portion shown in FIG. 3. This drawing shows a case in which the forward inclined tip portion is different from that of the invention and a tip portion 14' is inclined to the downstream side with respect to the fan rotary shaft 1. That is, in this drawing, an angle θ3 is in a range of 45° to 85°.

In this case, since an axial speed on the tip side is large, a loss of a shock wave is large.

On the contrary, in this invention, since the outside of the forward inclined tip portion 14 on the tip side is inclined forward, an inflow speed on the tip side is smaller than a case in which the outside is inclined backward (backward inclination) (FIG. 6), thereby reducing a loss of a shock wave.

Figure 7:
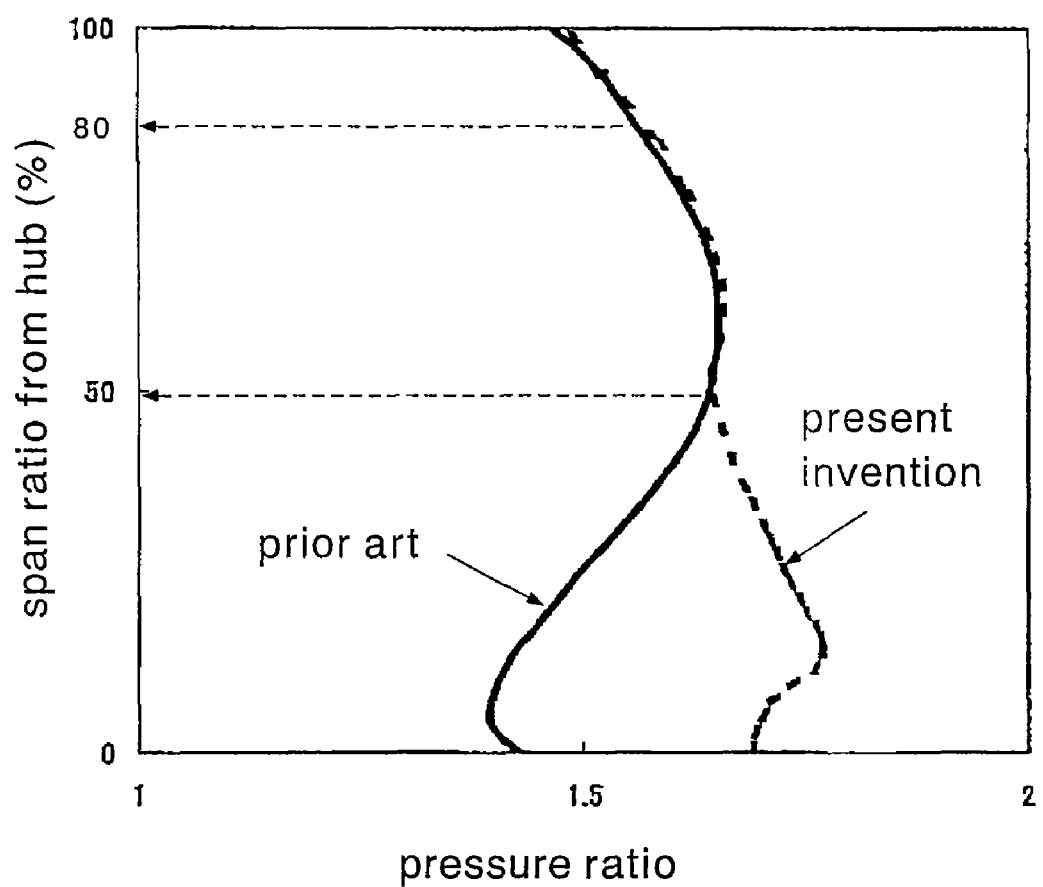
FIG. 7 is a CFD calculation result showing an embodiment of the invention.

FIG. 7 is a diagram showing an embodiment of the fan rotating blade according to the invention. This drawing shows a simulation result (CFD calculation result) using a computer. CFD means Computer Fluid Dynamics.

In this drawing, a horizontal axis denotes a pressure ratio and a vertical axis denotes a span ratio from the hub. Additionally, this example shows a case in which an outer end position b of the vertical hub portion 12 is about 50% and an outer end position c of the backward inclined mid-span portion 13 is about 80% with respect to the total radial span Ls of the leading edge part.

From this drawing, it is obviously understood that the pressure ratio of the invention is larger than that of the conventional art in a span ratio of 0 to 50%.

That is, as a CFD calculation result, the result shows that the flow rate for each sectional area is larger by 5% or so and the pressure ratio on the hub side is larger by 20% or so than the fan rotating blade according to the conventional art having the same fan diameter.

Additionally, the invention is not limited to the above-described embodiment, but can be, of course, modified into various forms without departing from the spirit of the invention.

For example, the rotating blade according to the invention is not limited by a degree of a bypass ratio, but can be applied in a case where the bypass ratio is small (for example, 1 or less) as well as a case where the bypass ratio is large (for example, 5 or more).

That is, since it is possible to increase an air flow rate of a fan first-stage rotating blade without enlarging the fan first-stage rotating blade and a diameter of a casing surrounding the fan first-stage rotating blade even in an engine having a small bypass ratio, it is possible to reduce the weight. Additionally, it is possible to more increase the pressure ratio on the hub side than that of the fan rotating blade according to the conventional art.

The invention claimed is:

1. A fan first stage rotating blade for a turbofan engine comprising:
   a leading edge part provided with a vertical hub portion positioned on the hub side so as to be substantially perpendicular to a fan rotary shaft;
   a backward mid-span portion inclined toward the downstream side from an upper limit of said vertical hub portion to an upper limit of said mid-span portion; and
   a tip portion integrally connected to said upper limit of said mid-span portion;
   said tip portion being forwardly inclined toward the upstream side from said upper limit of said mid-span portion to an upper limit of said tip portion;
   said vertical hub portion extending from an inner end position of 0% to an outer end position in a range of 20% to 50% with respect to a total radial span of the leading edge part and is positioned within a range of ±5° with respect to a plane perpendicular to the fan rotary shaft.

2. The fan rotating blade for the turbofan engine according to claim 1, wherein the backward inclined mid-span portion extends from an inner end position in a range of 20% to 50% to an outer end position in a range of 60% to 90% with respect to a total radial span of the leading edge part and its outside is inclined backward in a range of 5° to 45° with respect to a plane perpendicular to the fan rotary shaft.

3. The fan rotating blade for the turbofan engine according to claim 1, wherein the forward inclined tip portion extends from an inner end position in a range of 60% to 90% to an outer end position of 100% with respect to a total radial span of the leading edge part and its outside is inclined forward in a range of 5° to 45° with respect to a plane perpendicular to the fan rotary shaft.

* * * * *